United States Patent [19]
Kern et al.

[11] Patent Number: 5,794,952
[45] Date of Patent: Aug. 18, 1998

[54] SUPPORT ASSEMBLY FOR A PLASTIC BASKET OF A SHOPPING CART

[75] Inventors: Alan Kern; Scottlan Henry; Chris Johnson, all of Richmond, Va.

[73] Assignee: Rehrig International, Inc., Richmond, Va.

[21] Appl. No.: 710,854

[22] Filed: Sep. 23, 1996

[51] Int. Cl.⁶ ................................................. B62B 3/02
[52] U.S. Cl. ........................ 280/33.991; 280/33.992
[58] Field of Search .................... 280/33.991, 33.992, 280/33.997, 33.996, 79.1, 79.2; 220/71, 79.1, DIG. 15

[56] References Cited

U.S. PATENT DOCUMENTS

| | | |
|---|---|---|
| 3,999,774 | 12/1976 | Rehrig . |
| 4,376,502 | 3/1983 | Cohen . |
| 4,865,338 | 9/1989 | Rehrig . |
| 5,255,930 | 10/1993 | Jones et al. . |
| 5,289,936 | 3/1994 | Jones et al. . |
| 5,435,582 | 7/1995 | Davidson . |
| 5,441,288 | 8/1995 | Rehrig . |
| 5,458,347 | 10/1995 | Chiv . |

*Primary Examiner*—Richard M. Camby
*Attorney, Agent, or Firm*—Bacon & Thomas

[57] ABSTRACT

A shopping cart includes a basket made of plastic which is, at least partially, attached to a frame of the cart by a pair of basket supporting members. In a preferred embodiment each of the basket supporting members is a rod that includes a first end portion extending within an opening for supporting members. The opening is formed in an upper section of a respective side panel of the basket. A second end portion of the supporting member extends through a hole formed in a respective tubular post and downward within the tubular post. The second end portion of each of the basket supporting members may be retained within the tubular posts at a position spaced below the hole therein. By other embodiments the second end portion may be inserted into a tube member mounted on each tubular post, or may be wrapped around the tubular posts and then anchored on a cross member. An assembly process is described.

31 Claims, 3 Drawing Sheets

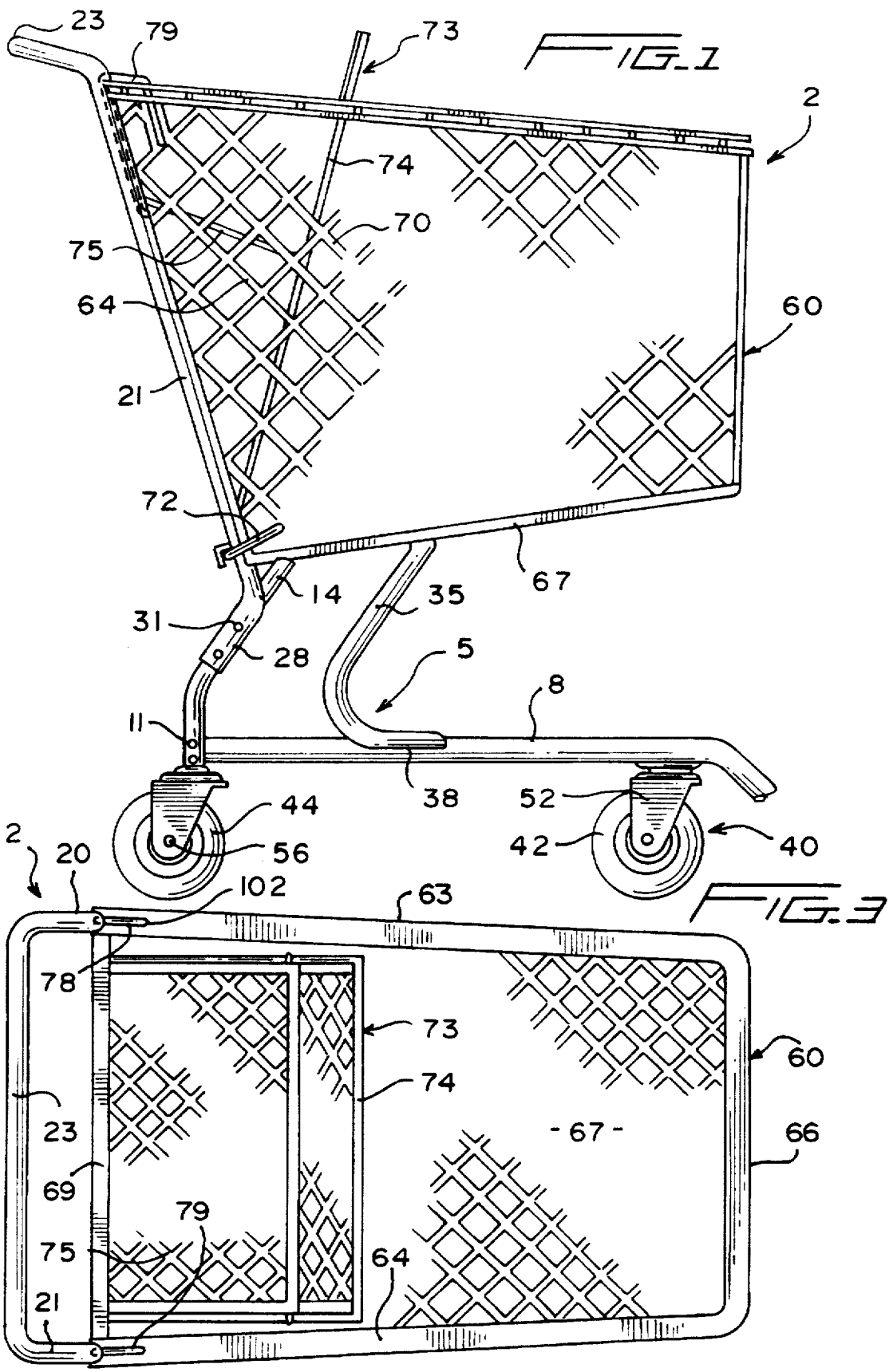

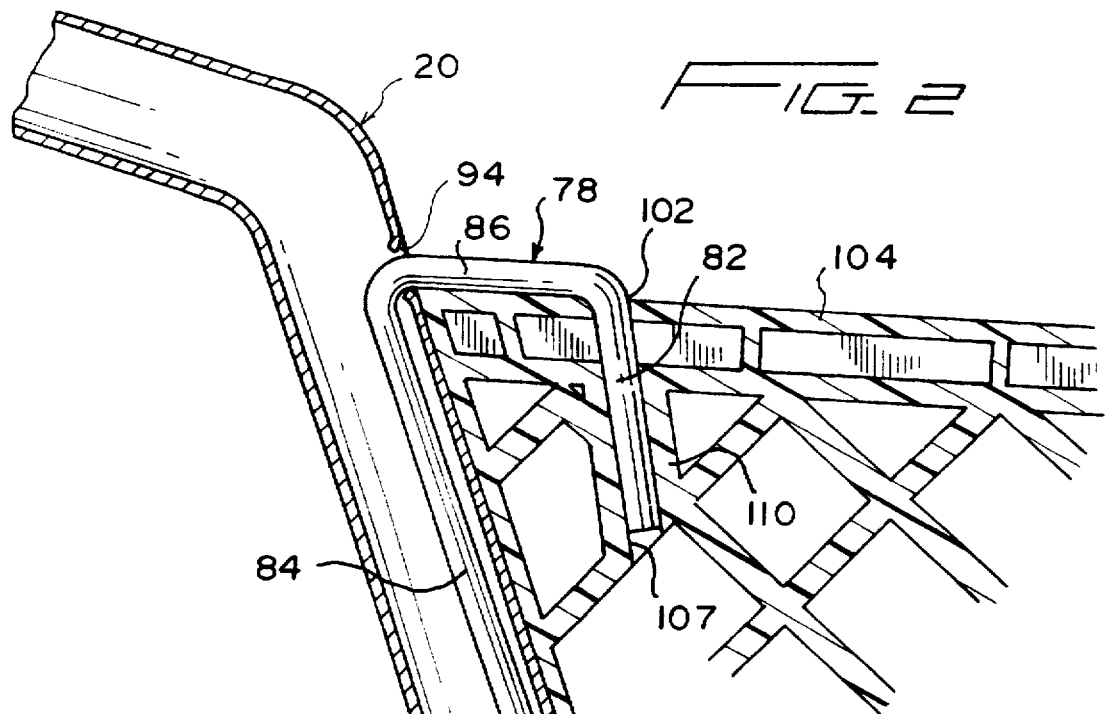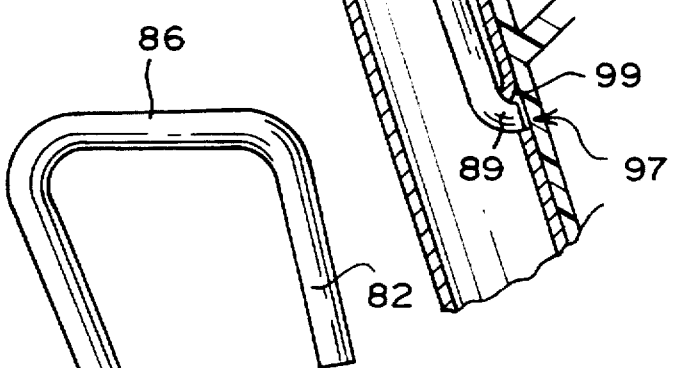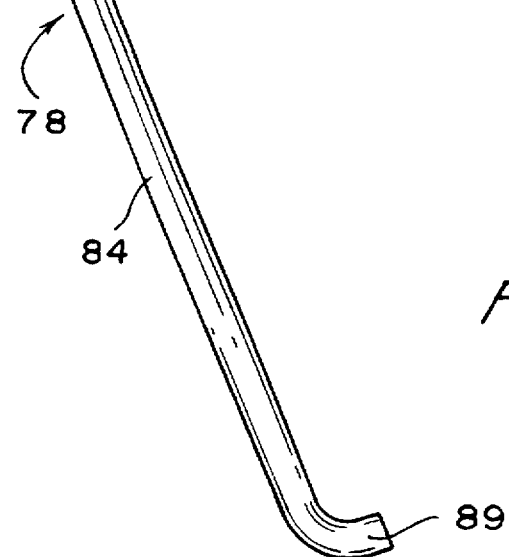

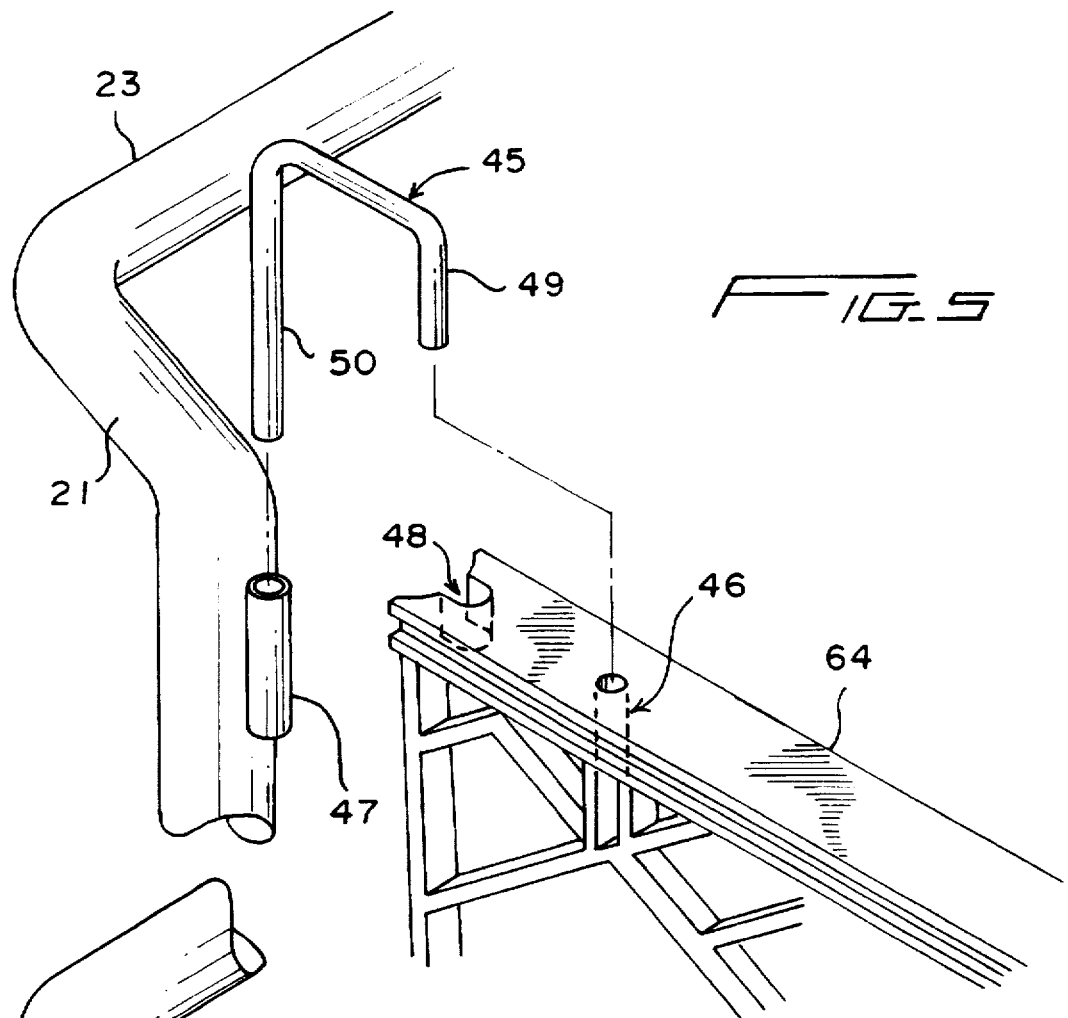
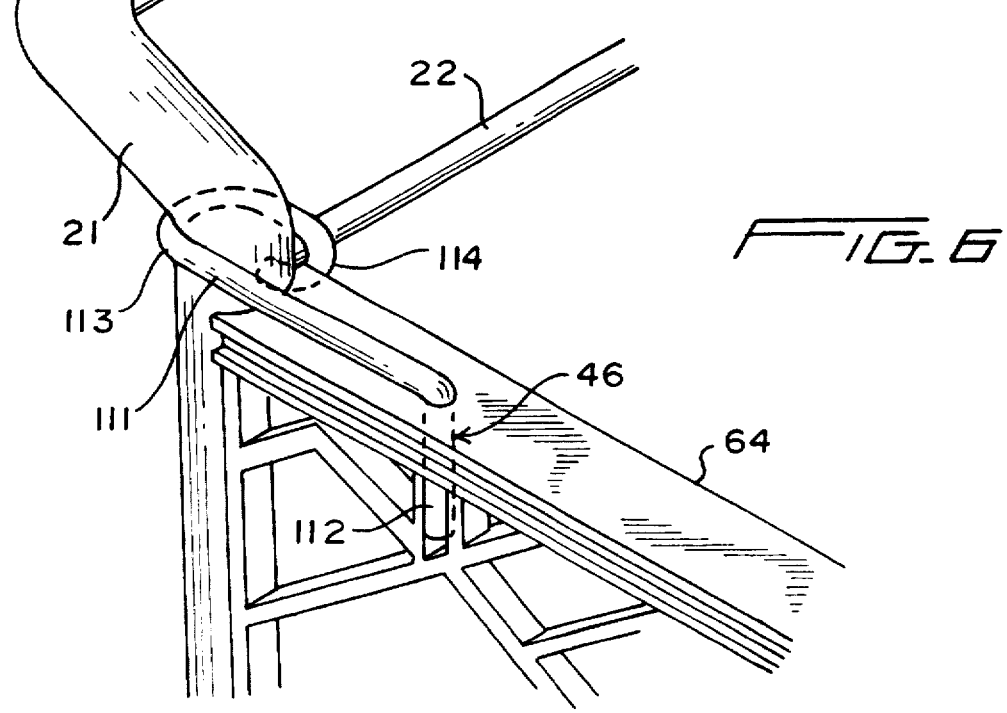

SUPPORT ASSEMBLY FOR A PLASTIC BASKET OF A SHOPPING CART

BACKGROUND OF THE INVENTION

1. Field of the Invention

The present invention pertains to shopping carts for use at supermarkets or the like and, more particularly, to an arrangement for supporting plastic baskets for such carts on the frames or chassis of the shopping carts.

2. Description of Related Art

Shopping carts used at supermarkets or the like are widely known in the art and generally include a basket supported upon a metal frame or chassis. The baskets for such carts typically are either formed from metal wires or molded plastic. Forming the baskets from plastic has numerous advantages since, for example, the baskets can be made lighter for ease of maneuverability, the plastic will not rust or corrode, and the baskets are less likely to cause damage to vehicles in the parking lot of a store using such baskets.

Various different arrangements have been proposed in the art for supporting a plastic basket from a cart frame. For example, U.S. Pat. No. 3,999,774 discloses a shopping cart having a plastic basket that is, at least partially, attached to a cart frame by a metal reinforcing ring that extends within a groove formed about the upper, outer perimeter of the basket and which is welded to upright tubular posts formed as part of the cart frame. With this arrangement, the plastic basket is essentially supported at an upper portion thereof in a cantilevered manner from the upright tubular posts. Additional supports also engage lower rearward portions of the basket.

Because the reinforcing ring extends continuously along the entire upper perimeter of the basket, such an arrangement lends considerable strength and rigidity to the cart. However, a substantial amount of time and material is required to form and assemble such a reinforcing ring which inherently adds to the associated costs of the shopping cart.

Based on this recognition, it is heretofore been proposed to minimizing material costs by utilizing a shortened support wire for interconnecting a top portion of a shopping basket to a cart frame, particularly for smaller and light-duty carts. For example, U.S. Pat. No. 5,441,288 discloses a shopping cart having first and second spaced side panels wherein an upper rear portion of a plastic basket is attached to upstanding tubular posts by means of a support wire which is secured at one end to an upper rear portion of the first side panel the plastic basket, extends about the two laterally spaced upstanding tubular posts and has its other end secured to the upper rear portion of the second side panel of the basket. With such an arrangement, a portion of the support wire extends across the upstanding tubular posts generally parallel to and slightly spaced from a handle member of the cart defined by the tubular posts. Although some savings in materials for the support wire is achieved through the arrangement disclosed in the U.S. Pat. No. 5,441,288, this arrangement still utilizes a support wire having considerable length and also the portion of the support wire that extends across the upstanding tubular posts is somewhat aesthetically unappealing and can be undesireably engaged by a user of the cart, even when simply attempting to grasp the handle of the cart.

Therefore, there exists a need in the art for a support arrangement for use in attaching a plastic basket to a frame of a shopping cart which will not only minimize the materials used in order to reduce costs but which will be aesthetically appealing, easy to manufacture and extremely reliable.

SUMMARY OF THE INVENTION

According to the present invention, a shopping cart is provided that includes a basket made of plastic which is, at least partially, attached to a frame by a pair of basket supporting members. Preferably, each of the basket supporting members include a first end portion that extends within a receiving opening formed in an upper section of a respective side panel of the basket and a second end portion that extends through a hole formed in a respective tubular post and downward within the tubular post. The second end portion of each of the basket supporting members is retained within the tubular posts at a position spaced below the hole therein. The receiving opening in each of the side panels is aligned with a bore formed in the respective side panel and the first end portion of each of the basket supporting members is firmly seated in a respective side panel by extending within the corresponding bore.

By this arrangement, the plastic basket is supported by a pair of spaced basket supporting members and only a small portion of the basket supporting members are visible such that an aesthetically appealing arrangement is provided. In addition, the length of the basket supporting members is quite short as compared to the prior art so that cost savings are achieved. Furthermore, the basket can be easily attached to a prepared cart frame by pre-inserting the basket supporting members within the tubular posts, inserting the first end portions of the basket supporting members in the respective receiving openings and bores of the side panels and shifting the assembly such that the second end portion of each of the basket supporting members slides down within the respective tubular posts, preferably until a retaining structure is engaged.

In still further embodiments of the present invention, it has been recognized that the pair of shortened basket supporting member can also be arranged to attach the second end portion to the respective tubular posts by other means. For example, in one further embodiment of the present invention the second end portions are assembled into tubes mounted on the sides of the tubular posts. The alignment of these tubes is such as to attach the side panels of the plastic basket tightly to the upstanding tubular posts of the frame for the shopping cart.

In a still further embodiment it has been found that the second end portion can be wrapped around each of the upstanding tubular posts and anchored around a cross member by way of a further bend at the end of the second end portion. Thus, a strengthened holding structure is achieved that realizes the features of the present invention.

BRIEF DESCRIPTION OF THE DRAWINGS

Additional features and advantages of the invention will be readily apparent from the following detailed description of a preferred embodiment thereof when taken in conjunction with the following drawings wherein like reference numerals refer to corresponding parts in the several views.

FIG. 1 is a side elevation view of a shopping cart incorporating a preferred basket support arrangement according to the present invention;

FIG. 2 is an enlarged sectional detail view of a portion of the shopping cart of FIG. 1;

FIG. 3 is a top view of the shopping cart of FIG. 1;

FIG. 4 is a side elevation view of a preferred embodiment of basket supporting member according to the invention;

FIG. 5 is an exploded perspective view of the connection of a second embodiment of the present invention; and FIG. 6 is a perspective view of a third embodiment according to the present invention.

DETAILED DESCRIPTION OF THE PREFERRED EMBODIMENTS

Initial reference is made to FIGS. 1 and 3 which depict a shopping cart 2, generally of the type used at supermarkets or the like, which utilizes the basket support arrangement of the present invention. The cart 2 is generally formed from a tubular frame or chassis 5 that includes a substantially U-shaped base 8 that is secured by rivets 11 to a pair of rear upstanding supports, one of which is shown at 14. Frame 5 further includes a pair of upstanding tubular posts 20 and 21 that are preferably formed as a single unit and are interconnected by means of a transversely extending handle member 23. At this point, it should be understood that upstanding tubular posts 20 and 21 could be readily formed as separate members and an auxiliary handle could extend therebetween or separate, laterally spaced handles could be provided. Each upstanding tubular post 20, 21 includes an associated clenched end 28 which is fixedly secured to a respective rear upstanding support 14, preferably by a plurality of rivets 31. In addition, frame 5 includes an intermediate, upstanding support 35 as best shown in FIG. 1. Intermediate, upstanding support 35 is secured at its respective ends to base 8 such as by welding at location 38.

As is known in the art, frame 5 is supported by a plurality of wheel assemblies 40. Preferably, four wheel assemblies are provided, two forward castors 42 and two rear wheel units 44. Each wheel assembly 40 is supported by a U-shaped bracket 52. As is known in the art, each bracket 52 for a respective castor 42 is adapted to pivot about a generally vertical axis such that castors 42 are permitted to swivel. In addition, each bracket 52 has extending between the U-shaped portion thereof a generally horizontally extending shaft 56 which defines an axis about which the individual wheels can rotate.

Cart 2 further includes a plastic basket 60. In the preferred embodiment, basket 60 is formed from polyethylene which is ideally suited for shopping carts since polyethylene is relatively strong and panels manufactured therefrom are flexible enough to absorb some deformation, such as caused by impact, without breaking. However, it should be recognized that other polymer materials having similar properties can also be used. Basket 60 comprises two side panels 63 and 64, a front panel 66, a bottom panel 67 and a rear panel 69. Side panels 63 and 64, front panel 66 and bottom panel 67 are preferably injection molded as a single, integral unit. On the other hand, rear panel 69 is preferably formed as a separate piece and is adapted to pivot relative to the remainder of basket 60 in a manner known in the art to provide for cart nesting. The entire basket 60 is preferably formed as an open latticework structure defined by multiple interesting web portions 70. Basket 60 is adapted to be supported by frame 5 and directly engages upstanding tubular supports 14 and 15 and intermediate, upstanding support 35. In addition, an attachment member 72, preferably in the form of a rod, extends around upstanding tubular posts 20 and 21 and is attached to side panels 63 and 64 in a manner also known in the art. For the sake of completeness, it should be mentioned that cart 2 could also be provided with a pair of legholes (not shown) formed in rear panel 69 that are associated with a retractable seat assembly generally indicated at 73. As known in the art, retractable seat assembly 73 is generally formed from a back portion 74 and a seat portion 75, all of which are pivotally interconnected to plastic basket 60. Since the structure and function of retractable seat assembly 73 is seen to be widely known the art, this assembly will not be further discussed in detail herein.

The preferred support arrangement for plastic basket 60 further includes a pair of basket supporting members 78 and 79. As best shown in FIGS. 2 and 4, each basket supporting member 78, 79 includes a first end portion 82 and a second end portion 84 which are interconnected by an intermediate portion 86. Second end portion 84 terminates in an in-turned terminal end 89. In the preferred embodiment, first end portion 82 extends at an angle towards second end portion 84. As will be discussed more fully below, when interconnected between basket 60 and tubular frame 5, first end portion 82 is shifted slightly further away from second end portion 84 such that this angle decreases and first and second end portions 82 and 84 are biased toward each other.

As best shown in FIG. 2 with reference to upstanding tubular post 20, an upper portion (not separately labeled) of upstanding tubular post 20 is provided with a hole 94 that opens into upstanding tubular post 20. At a distance spaced below hole 94, upstanding tubular post 20 is provided in a preferred embodiment with a catch structure generally indicated at 97. In the preferred embodiment, catch structure 97 defines an internal catch 99 which is punched into upstanding tubular post 20. As shown in FIGS. 1-3, the receiving opening 102 is formed in an upper, generally horizontal rail portion 104 of side panel 63. Receiving opening 102 is aligned with a bore 107 that is defined within a thickened web 110 of the latticework structure defining side panel 63. Of course, as clearly shown in FIG. 3, side panel 64 and upstanding tubular post 21 are adapted to receive basket supporting member 79 in a corresponding manner to that described above with respect to the attachment of basket supporting member 78.

The method of supporting plastic basket 60 from the laterally spaced, upstanding tubular posts 20 and 21 of cart 2 will now be described with particular reference to FIGS. 1 and 2. Once tubular frame 5 is fully assembled, the second end portion 84 of each basket supporting member 78 and 79 can be initially inserted within a respective hole 94 provided in the corresponding upstanding tubular post 20, 21. Once this initial insertion is made, basket 160 can be positioned and the first end portion 82 of each of the basket supporting members 78 and 79 can be partially inserted in a respective receiving opening 102. Thereafter, as plastic basket 60 is moved downward and rearward to the position represented in these figures, basket supporting members 78 and 79 will continue to extend further downward into upstanding tubular posts 20 and 21, as well as within receiving openings 102 and bores 107. Basket supporting members 78 and 79 will then become fully seated within bores 107 and further downward shifting of plastic basket 60 and basket supporting members 78 and 79 relative to tubular frame 5 will cause the in-turned terminal end 89 of each basket supporting member 78, 79 to engage beneath a respective internal catch 99. This shifting process slightly forces first end portion 82 and second end portion 84 of each basket supporting member 78, 79 to deflect away from each other such that a certain degree of spring loading is provided by each basket supporting member 78, 79 which causes in-turned terminal ends 89 to readily snap into engagement with catch structure 97 and further biases plastic basket 60 into engagement with upstanding tubular posts 20 and 21. At this point, the rearmost portions (not labeled) of side panels 63 and 64 will be positioned against upstanding tubular posts 20 and 21 as clearly shown in FIGS. 1-3. When basket supporting members 78 and 79 are fully seated, plastic basket 60 will be positioned upon rear upstanding supports 14 and intermediate upstanding support 35. Attachment member 72 can then be secured to fully retain plastic basket 60 in the desired position.

From the above description, it should be readily apparent that the invention presents a simple, effective and cost efficient supporting arrangement for the plastic basket 60 of a shopping cart 2. In addition, since only intermediate portion 86 of each basket supporting member 78 and 79 are visible following complete mounting of plastic basket 60 to tubular frame, 5, an aesthetically appealing supporting arrangement is provided. Although the intermediate portions 86 of basket supporting members 78 and 79 are shown to be positioned atop the upper, generally horizontal rail portions 104 of side panels 63 and 64 in these figures, it is also possible to provide a cavity (not shown) within rail portions 104 in order to recess intermediate portions 86.

A further embodiment of the present invention may be seen by way of FIG. 5 in which a connection is provided between the sides 63 and 64 to the respective upstanding tubular posts 20 and 21. In this embodiment one side of the arrangement is shown although both sides will be the same.

A shortened, generally U-shaped support member 45 is seen in FIG. 5 which maintains the construction in the same manner as described above. In this embodiment, however, the support member 45 is U-shaped with fastenings by legs 49 and 50, respectively, into a slot 46 in the side panel 64 and into a tube 47 fixed to the upstanding tubular post 21. Alternatively, the leg 50 of the support member may be inserted into and held by the upstanding tubular post 21, similarly to that shown in FIG. 2.

The legs 49 and 50 of the member 45 may be tensioned so that upon insertion into the respective slot 46 and tube 47, or post 21, the side panel 64 is held tightly by the post 21. The legs 49 and 50 are shown of different lengths, but may be formed of equal lengths or reversed lengths.

Importantly, the support member is of minimal size and is virtually hidden in this construction so as to provide an aesthetically pleasent appearance while maintaining a strong construction.

In the same manner, FIG. 6 shows a construction of the present invention where the support member 111 is used with a cross member 22 between the upstanding tubular posts 20 and 21, as shown above. In this embodiment, the basket support member 111 is formed with a leg 112 engaging slot 46. At its opposite end, the support member 111 includes a loop 113 around the tubular post 21 ending in a further loop 114 about the cross member 22.

This construction also results in strong construction for holding the sides 63 and 64 to the upstanding tubular posts 20 and 21. The leg 112 may be tensioned to pull the structures tight together where the other end of the member 111 is wrapped about the post and cross member.

Although described with respect to a preferred embodiment of the invention, it should be readily understood that various changes and/or modifications to the present invention can be made without departing from the spirit thereof, such as seen in the second and third embodiments above.

Further, even though the preferred embodiment described above incorporates a punched internal catch 99, it should be readily realized that other types of retaining arrangements could be utilized in accordance with the invention such as, for example, simply providing holes which extend through the upstanding tubular posts 20 and 21. Also, for some applications, a detent, friction catch or other equivalent to a catch structure 97 could be used, or friction alone between terminal end 89 and tubular post 20 could be used, to retain the basket supporting members 78 and 79 in the tubular posts 20 and 21. Furthermore, other equivalents to the disclosed elements of the preferred embodiment of the invention could be substituted in accordance with known technical information. In general, the invention is only intended to be limited by the scope of the following claims.

We claim:
1. A shopping cart comprising:
a cart frame having wheels and a pair of laterally spaced upstanding tubular posts;
at least one handle defining member attached to said cart frame;
a plastic basket including a pair of side panels, a front panel, a bottom panel and a rear panel, each of said side panels having an opening at an upper portion thereof; and
a pair of basket supporting members, each of said basket supporting members being separate from the other and each including a first end portion extending through a respective opening in a side panel and a second end portion engaging and secured to a respective post, said first and second end portions being bent relative to the posts and side panels such that, when the supporting members are located with their first and second end portions in a respective side panel opening and engaging a respective post, the retaining members individually hold a respective side panel tightly against a post and prevent each side panel from separating from its respective post.

2. The shopping cart as claimed in claim 1, wherein each post includes an opening and said second end portion of each retaining member is inserted into a respective opening of a post and is tensioned toward said first end portion.

3. The shopping cart as claimed in claim 2, wherein said posts each including an inner surface within the post and said second end portion including a foot end bearing against an inner surface of a respective post.

4. The shopping cart as claimed in claim 2, wherein said second end portion has a foot end protruding through a lower opening in said upstanding tubular posts.

5. The shopping cart as claimed in claim 1, wherein each of said upstanding tubular posts includes an attached holding member for receiving and holding a respective second end portion of a supporting member.

6. The shopping cart as claimed in claim 5, wherein said holding member includes a tubular part attached to said upstanding tubular posts, said second end portion being inserted into said tubular part.

7. The shopping cart as claimed in claim 6, wherein said tubular part is housed within an edge portion of said side panels.

8. The shopping cart as claimed in claim 1, wherein said second end portion of each support member is secured to a respective tubular post by way of a circular bend of the support member about the outside edge of a respective post.

9. The shopping cart as claimed in claim 8, including a cross member spanning said posts, and wherein said second end portion has a further portion bending around the cross member.

10. The shopping cart as claimed in claim 1, wherein said first end portion and said second end portion of each supporting member are tensioned toward one another.

11. The shopping cart as claimed in claim 1, wherein said side panels each includes a slot and said first end portion is inserted into a slot in each of said side panels.

12. A shopping cart comprising:
a cart frame having wheels and a pair of laterally spaced upstanding tubular posts, each of said tubular posts being provided with a hole at an upper section thereof;

at least one handle defining member attached to said cart frame;

a plastic basket including a pair of side panels, a front panel, a bottom panel and a rear panel, each of said side panels being formed at an upper portion thereof with an opening adjacent to said rear panel;

a pair of basket supporting members, each of said basket supporting members being separate from the other and each including a first end portion extending within said opening of a respective one of said side panels and a second end portion extending through the hole and downwardly within the upper section of a respective one of said tubular posts; and a retaining arrangement adapted to secure said basket supporting members against withdrawal from a respective aperture.

13. The shopping cart as claimed in claim 12, wherein said retaining arrangement comprises an interengagement between the second end portion of each of said basket supporting members and a respective one of said tubular posts.

14. The shopping cart as claimed in claim 13, wherein each of said retaining arrangements comprises an internal catch formed in a respective one of said tubular posts below a respective hole, said second end portion of each of said basket supporting members engaging a respective internal catch.

15. The shopping cart as claimed in claim 14, wherein said internal catch of each of said tubular posts is formed in a frontal portion of said tubular posts, directly adjacent said rear panel.

16. The shopping cart as claimed in claim 12, wherein the first and second end portions of each of said basket supporting members are interconnected by an intermediate portion and extend at an angle towards each other from the intermediate portion.

17. The shopping cart as claimed in claim 16, wherein the geometry of the basket, tubular posts and basket supporting members is such that the first and second end portions of each of said basket supporting members are biased away from each other such that said angle is decreased upon insertion of the support member in each of said tubular posts and said opening during assembly of said basket to said frame.

18. The shopping cart as claimed in claim 16, wherein the second end portion of each of said basket supporting members is longer than the first end portion thereof and includes an in-turned terminal end.

19. The shopping cart as claimed in claim 12, wherein the upper portion of each of said side panels defines a generally horizontal rail, said receiving opening extending downwardly through said rail.

20. The shopping cart as claimed in claim 19, wherein each of said side panels constitutes an open latticework structure defined by a plurality of intersecting web members, at least one of said web members, located adjacent said rear panel, having a bore therein that is aligned with a respective said receiving opening and which receives the first end portion of a respective said basket supporting member.

21. A shopping cart comprising:

a cart frame having wheels and a pair of laterally spaced upstanding tubular posts, each of said tubular posts being provided with a hole at an upper section thereof and retaining means spaced below said hole;

at least one handle defining member attached to said cart frame;

a plastic basket including a pair of side panels, a front panel, a bottom panel and a rear panel, each of said side panels being formed at an upper portion thereof with a supporting member receiving opening adjacent said rear panel; and a pair of basket supporting members, each of said basket supporting members being separate from the other and each including a first end portion extending within the receiving opening formed in a respective one of said side panels and a second end portion that extends through the hole and downwardly within the upper section of a respective one of said tubular posts and engages a respective retaining means for supporting said plastic basket upon said cart frame.

22. The shopping cart as claimed in claim 21, wherein each of said retaining means is defined by a catch formed in a frontal portion of a respective said tubular post, directly adjacent said rear panel.

23. The shopping cart as claimed in claim 21, wherein the first and second end portions of each of said basket supporting members are interconnected by an intermediate portion and extend at an angle towards each other from the intermediate portion.

24. The shopping cart as claimed in claim 23, wherein the geometry of the basket, tubular posts and basket supporting members is such that the first and second end portions of each of said basket supporting members are biased away from each other such that said angle is decreased upon insertion of the support member in the tubular posts and said supporting member receiving openings during assembly of said basket to said frame.

25. The shopping cart as claimed in claim 23, wherein the second end portion of each of said basket supporting members is longer than the first end portion thereof and includes an in-turned terminal end.

26. The shopping cart as claimed in claim 21, wherein the upper portion of each of said side panels defines a generally horizontal rail, said receiving opening extending downward through said rail.

27. The shopping cart as claimed in claim 26, wherein each of said side panels constitutes an open latticework structure defined by a plurality of intersecting web members, at least one of said web members, located adjacent said rear panel, having a bore therein that is aligned with a respective one of said receiving openings and which receives the first end portion of a respective one of said basket supporting members.

28. A method of supporting a plastic basket from laterally spaced, upstanding tubular posts of a shopping cart frame comprising:

forming basket openings in upper rear end portions of side panels of the plastic basket;

providing a pair of separate basket supporting members each having first and second end portions;

inserting the first end portion of each of said basket supporting members into a respective said opening; and attaching said second end portion of each of said basket supporting members to a respective one of said tubular posts to thereby secure said plastic basket to said cart frame.

29. The method of supporting a plastic basket as claimed in claim 28, further comprising:

forming each of said side panels with an upper, generally horizontally extending rail and open latticework walls defined by intersecting web portions located below the rail; and forming each of said receiving openings by providing a hole in a respective one of said upper rails that is aligned with a bore located below the hole and that is formed in at least one of said web portions.

30. The method of supporting a plastic basket as claimed in claim 28, further comprising:

forming the second end portion of each of said basket supporting members with an in-turned terminal end that directly engages a respective retaining means.

31. The method of supporting a plastic basket as claimed in claim 28, further comprising:

retaining said second end portion by punching out a section of a respective tubular post.

* * * * *